Julius Hagemann
INVENTOR.

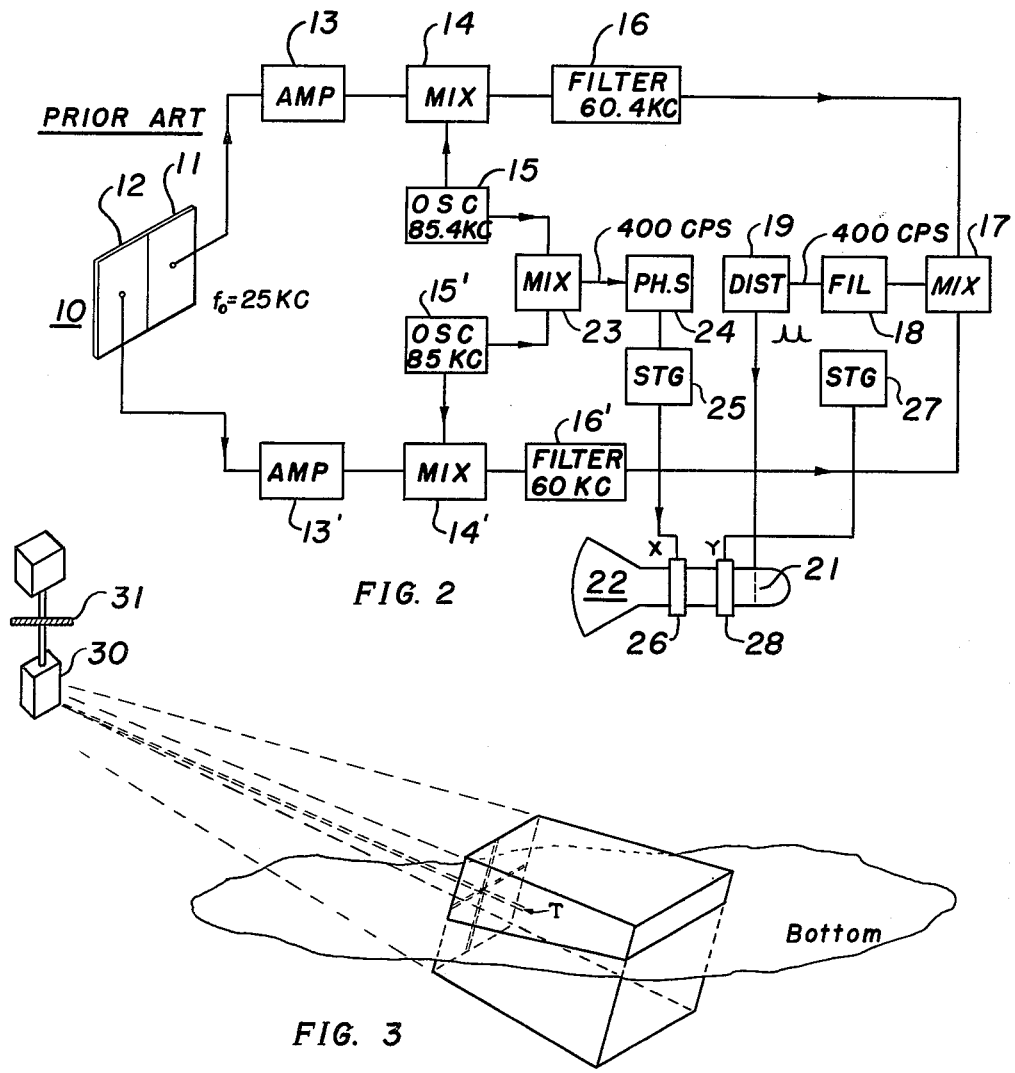

United States Patent Office 3,012,222
Patented Dec. 5, 1961

3,012,222
SYSTEM FOR DISPLAYING SONIC ECHOES FROM UNDERWATER TARGETS
Julius Hagemann, 412 S. MacArthur Ave., Panama City, Fla.
Filed Aug. 8, 1957, Ser. No. 677,166
7 Claims. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

The present invention relates to scanning type sonic pulse transmission-reception systems and more particularly to such sonic echo systems having high resolving power.

The invention is of special utility in classifying bottom objects in a seaway but of course is not restricted thereto.

The general object of the invention is to provide sonic apparatus which scans both in azimuth and declination to provide an indication of the approximate size of a detected object on the sea bed.

The system according to the invention may be considered basically as one in which two Sector Scan Indicator (SSI) chains are interlinked to form a highly defined pencil of receiver beam width which rapidly scans over the extension of the field of view in azimuth and declination.

A brief discussion of the principles of the SSI system will aid in understanding the invention and the many advantages and new results made possible by it.

The SSI system is a device for presenting on the screen of a cathode ray tube an indication of the reflecting objects in the field of a sound wave transducer. Such objects are displayed on the screen as a series of short bright horizontal-line segments with vertical deflection from the bottom proportional to range and with horizontal deflection from a vertical center line proportional to angular deviation from the axis of the sound beam. SSI uses a transducer split electrically along the vertical diameter (or along the horizontal diameter for use in the vertical plane). When an echo is received along the beam axis of the transducer the two halves thereof respond alike. When the echo signal is displaced to the right or the left of the beam axis it reaches the right or the left half of the transducer before it reaches the other half, giving rise to a phase lead in the response of one half ahead of the response of the other half. This phase difference is utilized to produce an indication of the deviation of the reflector to the right or the left of the beam axis, the two responses being processed by two channels comprising an SSI chain.

In accordance with the present invention the transducer is split both vertically and horizontally to provide in effect two SSI chains, one chain processing azimuth information from the transducer split vertically and the other chain processing declination information from the horizontally split halves of the transducer. A time reference system (local oscillators) is employed in each chain for detecting the phase of the output signal and for synchronizing the pertinent sweep circuit of a cathode ray tube. The signal output from the azimuth chain is fed to the intensity grid of the cathode ray tube through an electronic gate opened by the signal output from the declination chain, the arrangement being such that the intensity grid is energized only when the instantaneous outputs of both chains coincide thereby insuring that a reflecting target will be shown in its position in azimuth and declination (C-type presentation).

The invention will be understood from the following description when read in connection with the accompanying drawing in which:

FIG. 2 is a block diagram of a known SSI signal processing chain; and

FIG. 3 illustrates an energy pulse traveling through the water.

Figure 1:
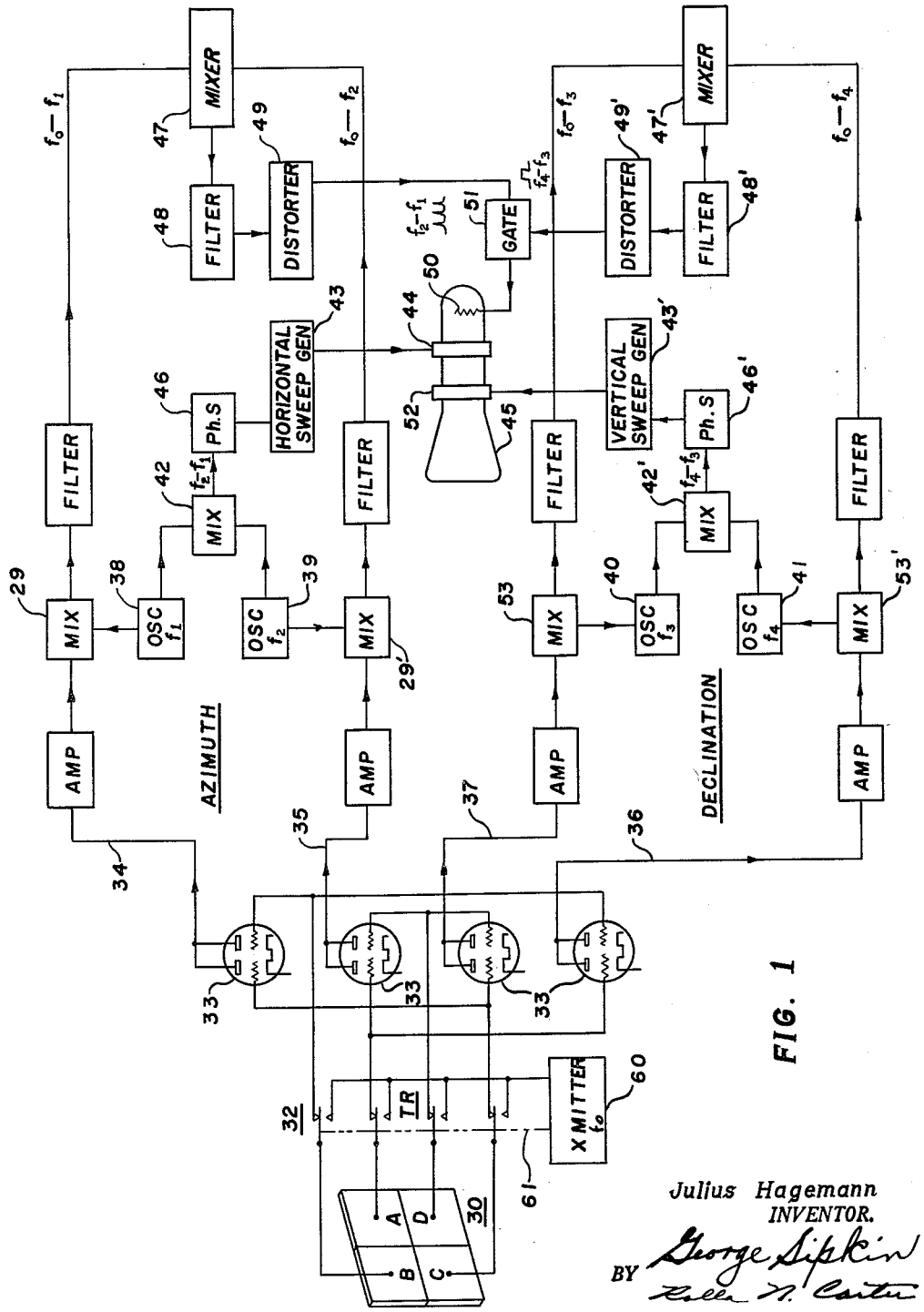
FIG. 1 is a conventionalized showing of an apparatus embodying the invention.

It is believed that the embodiment of the invention illustrated in FIG. 1 will be more readily understood by first describing a known SSI system such as is shown in FIG. 2.

Referring now to FIG. 2, a transducer 10 for receiving compressional wave energy signals at frequency $f_0$ is shown split vertically, electrically, into two halves 11 and 12 each of which receives the same signal but with a phase difference depending upon the angle the signal makes with the perpendicular axis of the transducer 10. The responses of the two halves 11 and 12 are processed through a superheterodyne channel individual thereto. The channel for the signal from the transducer half 11 includes an amplifier 13, a mixer 14, a local oscillator 15, a filter 16, and a mixer 17. The channel for the signal from the transducer half 12 also includes an amplifier 13', a mixer 14', a local oscillator 15', a filter 16', and the mixer 17. The local oscillators 15 and 15' are separated in frequency so that the output of the mixer 17 is a difference frequency which may be passed through a filter 18 to a distorter 19 to provide periodic spikes which are employed to modulate the intensity grid 21 of a cathode ray tube 22. The oscillators 15 and 15' are heterodyned against each other in a mixer 23 to produce a voltage at the difference frequency that may be regarded as a reference and which after inversion and distortion by a phase shifter 24 is employed to synchronize a horizontal sweep generator 25 for the X-axis deflecting coil 26 of the cathode ray tube 22. A vertical sweep generator 27 is employed for applying a linear saw-tooth waveform to the Y-axis deflecting coil 28 of the cathode ray tube 22. In echo ranging, the vertical sweep generator 27 is synchronized with the keying pulse in order that the upward displacement on the cathode ray tube 22 will correspond to range.

With the system shown in FIG. 2, if the received signal $f_0$ is 25 kc. and the local oscillators 15 and 15' are tuned to the different frequencies 85.4 kc. and 85 kc. as indicated, the intermediate frequencies of 60.4 kc. and 60 kc. after being combined, distorted and clipped produce extra high pips when they occur at the same time, as they do at phase coincidence once every 1/400 second. Only these high pips are permitted to pass to the intensity grid 21 of the cathode ray tube 22. Remembering that the horizontal sweep is 1/400 of a second it is evident that the signal pips will brighten the cathode ray at the position in each horizontal sweep corresponding to the phase difference (the electrical angle) between the received signal as viewed or heard by the two transducer halves 11 and 12 and the reference voltage from the mixer 23.

Referring to FIGS. 1 and 3, a transducer 30 for transmitting and receiving compressional wave energy is shown projecting down into the water through a ship's hull 31. The transducer 30 is split, electrically only, along vertical and horizontal diameters into quadrants A, B, C, and D, and is supported by a three-axis system of stabilization (not shown) for keeping the splits vertical and horizontal despite rolling and pitching of the ship's hull 31. The four quadrants A, B, C, and D are shown as being individually connected through separate contacts of a transmit-receive (TR) switch 32 to the grids of isolating tubes 33 the plates of which are connected to signal processing channels 34, 35, 36 and 37 in such a manner that the vertically split transducer halves B, C, and A, D are connected to the channels 34 and 35, respectively, and the horizontal split transducer halves B, A and C, D are connected to the channels 36 and 37, respectively.

With this arrangement it will be evident that the channels 34 and 35 comprise an SSI chain for processing signals containing information in azimuth while the channels 36 and 37 comprise in effect an SSI chain for processing signal information in declination. The channels 34 and 35 comprising the azimuth SSI chain is quite similar to the processing chain described in connection with FIG. 2 and has two local oscillators 38 and 39 which are heterodyned against each other in a mixer 42 to provide a frequency $f_2-f_1$ for controlling the horizontal sweep generator 43 for the horizontal deflecting coil 44 of a cathode ray tube 45, a phase shifter 46 being inserted in the circuit for zeroing, i.e., a target at zero azimuth appears in the center of the horizontal sweep. The output of the local oscillators 38 and 39 are also included, respectively, in the superheterodyne channels 34 and 35 to provide in mixers 29 and 29' intermediate frequencies which when combined in a mixer 47 produce a difference frequency also equal to $f_2-f_1$. This difference frequency is passed through a filter 48 and a distorter 49 to provide periodic spikes or pips for application through a gate 51 to the intensity grid 50 of the cathode ray tube 45. The gate 51 is controlled by the processed output of the declination SSI chain which is the same as the azimuth chain except that its local oscillators 40 and 41 are preferably tuned to a different difference frequency. These respective frequencies $f_3$ and $f_4$ are heterodyned against each other in a mixer 42' and fed through a phase shifter 46' for vertical centering of the vertical sweep generator 43' for applying a saw-tooth wave frequency $f_4-f_3$ to the vertical deflecting coil 52 of the cathode ray tube 45. These local oscillators 40 and 41 are also included in the superheterodyne channels 37 and 36 to provide in mixers 53 and 53' intermediate frequencies which when combined in a mixer 47' provide an output frequency of $f_4-f_3$. Although the output of the mixer 47' has a nominal frequency of $f_4-f_3$ it is effectively a transient since it is only one cycle in length. This output transient is then passed through a low pass filter 48' and a distorter 49' to provide a pulse for controlling the opening of the gate 51. Inasmuch as the signal frequency output of the mixer 47 is constant in spite of doppler shifts in the echo, the bandpass filter 48 may be quite sharp to secure a reduction of background noise.

In one numerical example to be discussed below the width of the pips in the signal train at the output of the distorter 49 is made to be $10^{-7}$ seconds, the signal train has a frequency of 200 kc. and hence a wave period of $5 \times 10^{-6}$ seconds, and the width of the pulse at the output of the distorter 49' is made to be $5 \times 10^{-6}$ seconds. Thus, if the two-way split transducer 30 is laid out such as to provide the desired angle of view in both azimuth and declination, say 5° geometrical corresponding to 360° electrical, and the frequencies $f_1$ and $f_2$ of the local oscillators 38 and 39 in the azimuth chain are chosen such that $f_2-f_1$ is 200 kc. and the local oscillators 40 and 41 in the declination processing chain are chosen such that $f_4-f_3$ equals 4 kc. the receiver beam is $\frac{1}{10}$° in width. In order that the entire field of view of 5° by 5° will be just covered with the scanning rates of 200,000 cycles per second in azimuth and 4000 cycles per second in declination the length in seconds of the transmitted energy pulse into the water should be 0.25 milliseconds which corresponds to a zone of energized water 1.25 feet in thickness traveling away from the transducer 30, as indicated in FIG. 3. This 0.25 millisecond obviously is the reciprocal of 4,000 and also the product of the reciprocal of 200,000 multiplied by the numerical quotient of 5° divided by $\frac{1}{10}$°.

Referring again to FIG. 1, a transmitter 60 for driving the transducer 30 to propagate a compressional wave pulse into the water is shown to be connectable to the transducer 30 through the TR switch 32. As indicated in the drawing a control member 61 common to the four switch elements in the switch 32 is operated by the transmitter 60 to connect the transmitter to the four quadrants A, B, C, and D in parallel. In accordance with the example given above, the transmitter 60 will be adjusted to drive the transducer 30 for 0.25 millisecond each time the TR switch 32 is moved to transmit position. In accordance with the usual practice the transmitter 60 is adjusted to delay switching to the receive position a desired short time interval after propagation of the 0.25 millisecond pulse so as to avoid reception of the nearby reverberation. With a horizontal scan rate of 200,000 cycles per second the signal output from the distorter 49 in the azimuth chain will consist of a train of short spikes or pips with a frequency of 200,000 cycles per second and a length equal to the length of the echo from the reflecting point which normally will be equal to the length of the propagated pulse. Hence, for a 0.25 millisecond transmitted pulse and a scan rate of 200,000 cycles per second the signal from a reflecting point will consist of 50 pips, i.e., one pip for each horizontal scan. Inasmuch as these pips from the distorter 49 cannot reach the grid 50 of the cathode ray tube 45 except when the gate 51 is open and since this gate 51 is open only during the presence of a pulse from the distorter 49' a brightening signal reaches the grid 50 only when the instantaneous output of both the azimuth and declination chains coincide. It may be noted that since the pulse from the distorter 49' has a repetition rate of 4000 times a second and a width of $5 \times 10^{-6}$ seconds it can open the gate 51 once during a complete vertical scan and hold it open during one complete horizontal scan. The scanning raster developed by the horizontal scan and the vertical scan thus has a line frequency in the horizontal dimension and a frame frequency in the vertical dimension equal, respectively, to the horizontal scan rate and the vertical scan rate. If the electrical phase relations in both these chains are translated back into their corresponding geometrical equivalents within the field of view of the transducer 30 it can be shown that the geometrical intersection of the instantaneous azimuth and declination wedges, as indicated in FIG. 3, must be on the target T. Thus for each scanned frame the cathode ray tube 45 will show a reflecting element within a zone of energized water of 1.25 feet in thickness and will present any such reflecting target in its position in azimuth and declination (C-type presentation).

Instead of employing different scan rates for the azimuth and declination chains the two chains may have the same parameters, e.g., a scan rate of 200,000 cycles per second and a pip width of $10^{-7}$ seconds. With this arrangement by proper adjustment of the phase controls 46 and 46' for the X and Y deflection coils of the cathode ray tube 45 it is possible to have a beam of receiver sensitivity of $\frac{1}{10}$°, the scanning taking place across the diagonal of the field of view. Thus, if the phase controls 46 and 46' are continuously shifted in a certain repetitive manner, e.g., once every 0.25 millisecond, it is possible to provide a regularly recurrent coverage of the whole field of view. The raster will be comprised of scan lines parallel to the diagonal of the rectangular raster, each scan line other than the one coinciding with said diagonal being alternately traced on opposite sides of said diagonal so that the raster is alternately constructed from said diagonal to an opposite corner and from the other opposite corner towards said diagonal and the presentation will be X—Y. Alternatively, the same effect can be obtained by keeping the phase shifters 46 and 46' fixed and to introduce a suitable frequency difference of the scan rates, viz., with a scan rate of 198,000 in declination and 202,000 in azimuth (or vice versa) the coverage of the field of view will be 4000 times per second, i.e., once every 0.25 millisecond.

In describing the employment of the apparatus of the invention for classifying bottom objects it is assumed that the object has been detected and located and that the only remaining problem is that of classification. After the range of the detected object has been closed to say 300 feet the transducer 30 is aimed towards the detected object and kept within its field of view as the range is slowly closed to the optimum viewing distance. The optimum viewing distance depends upon several variables, water depth and target dimensions and aspect being the most important once the parameters of the equipment have been selected. Water depth enters because its is preferable that the axis of the sonic beam makes a small angle with the water bed, say about 10° at 300 feet in 50 feet of water, to provide a number of "looks" in succession, it being remembered that with the above apparatus one look is available for each fifteen inch increment along the beam axis and that the larger the angle the smaller the bottom area scanned. In water fifty feet deep the optimum viewing distance (horizontal) for mine-like objects will generally be around fifty to sixty feet, i.e., a beam angle of about 45°, although in special situations much larger beam angles provide useful information. Parenthetically, accurate range and azimuth information is still available from the equipment and can readily and continuously be extracted from the azimuth chain in the conventional manner so that the approach of the vessel towards the object can be closely watched.

For classification purposes a range setting of about 300 feet is considered adequate and this allows for a pulse repetition rate of eight per second when using the frequencies and pulse length chosen for the above described example. At this and shorter ranges there is no objection to the employment of these high frequencies since signal attenuation beyond this distance rather than being a drawback gives the advantage of reducing echoes from beyond the field of interest. Thus a one-quarter millisecond pulse used with azimuth and vertical scan rates of 200,000 cycles per second and 4000 per second, respectively, provide a "look" for each 1.25 foot thick zone of water, thereby giving successive "looks" at an average mine from which its size may be estimated. Approximate size classification of bottom objects is a distinct advance in the mine hunting art. At shorter ranges it may even be possible for the observer to estimate the general shape of the object target.

While for the purpose of disclosing the invention a preferred embodiment thereof has been described in detail it is to be understood that the invention is not limited thereto and that modifications obvious to those skilled in the art are intended to be included within the scope of the appended claims.

What is claimed is:

1. A scanning type pulse transmission-reception system for providing information enabling a determination of the approximate size of an underwater object comprising means for transmitting a pulsed beam of compressional wave energy toward the object, means for receiving wave energy reflected by the object including effectively four similar transducers arrayed symmetrically in the quadrants of a vertical plane about an axis normal thereto whereby the horizontal and vertical angles the reflected wave makes with the plane of the transducers correspond to the direction of the reflecting object with respect to said axis, means including two local oscillators of different frequencies connected to heterodyne against each other for producing a first reference phase wave train and individually against the output of the two right transducers and the output of the two left transducers and means for mixing the beat frequencies of these two heterodyne outputs for producing a first series of signal pulses having the frequency of said first reference phase wave train and differing in phase therefrom corresponding to said horizontal angle, means including two additional local oscillators of different frequencies connected to heterodyne against each other for producing a second reference phase wave train and individually against the output of the two upper transducers and the output of the two lower transducers and means for mixing the beat frequencies of these two heterodyne outputs for producing a second series of signal pulses having the frequency of said second reference phase wave train and differing in phase therefrom corresponding to said vertical angle, a cathode ray tube having an intensity grid and horizontal and vertical deflecting means, a sweep circuit for the horizontal deflecting means connected to be initiated by each wave of the first reference phase wave train, a sweep circuit for the vertical deflecting means connected to be initiated by each wave of the second reference phase wave train, and means responsive to phase coincidence of two signal pulses in said first and second series for energizing the intensity grid of the cathode ray tube.

2. A system in accordance with claim 1 and further including means for individually shifting the phase of said first and second wave trains whereby the initiations of the horizontal and vertical sweep circuits may be so phased that the signal pulses produced by wave energy reflected along the axis of the receiving means occur, respectively, in the center of the horizontal sweep and in the center of the vertical sweep.

3. A system in accordance with claim 1 wherein the transmitted wave energy is pulse for a time interval of $t$ seconds, the frequency of the first reference phase wave train in cycles per $t$ seconds is equal to the numerical quotient of the angular field in view of degrees divided by the desired receiver beam width in degrees, and the frequency of the second reference phase wave train is one cycle per $t$ seconds.

4. A system for displaying the azimuth and declination of a source of a pulse of underwater compressional wave energy with respect to a point on an axis of view comprising four transducers arranged symmetrically in the quadrants of rectangular co-ordinates centered on said point and defining a plane normal to the axis of view, an output channel for each transducer, a source of a first reference frequency, means for combining the output of the transducers in the right-hand quadrants with the output of the transducers in the left-hand quadrants to produce a series of signal pulses at the frequency of the first reference frequency and differing in phase from the first reference frequency corresponding to the azimuthal direction of said source of wave energy, a source of a second reference frequency, means for combining the output of the transducers in the upper quadrants with the output of the transducers in the lower quadrants to produce a gating pulse having a phase relation with the second reference frequency corresponding to the declination of said source of wave energy and a width equal to the wave period of the first reference frequency, a cathode ray tube having a fluorescent screen, means for forming a cathode ray, an intensity grid, and a ray-deflecting system for producing a scanning raster having a line frequency in one dimension and a frame frequency in the orthogonal dimension on the fluorescent screen, means connected to the ray-deflecting system for synchronizing the line frequency and the frame frequency of the scanning raster with the first reference frequency and the second reference frequency, respectively, and a gate circuit connecting said signal pulse to the intensity grid and connected to be in open condition only during a gating pulse.

5. A system in accordance with claim 4 wherein the length in time of the pulse of compressional wave energy is $t$ seconds, the first reference frequency in cycles per second is equal to the product of the reciprocal of $t$ times the numerical quotient of the angle of the field of view in degrees divided by the desired receiver beam width in degrees, and the second reference frequency in cycles per second is equal to the reciprocal of $t$.

6. A system in accordance with claim 5 including a transmitter oscillator, means for alternately connecting the output of said oscillator to said transducers in parallel and said transducers to their individual output channels, said oscillator being connected to said transducers for a time interval of $t$ seconds and said transducers being connected to their output channels for the time interval corresponding to the maximum range desired.

7. A system in accordance with claim 4 wherein the length of the pulse of compressional wave energy is $t$ seconds of time, the first reference frequency and the second reference frequency are equal to each other and to the product of the reciprocal of $t$ times the numerical quotient of the angle of the field of view in degrees divided by the desired receiver beam width in degrees, and the means connected to the ray-deflecting system includes means for continuously shifting the phases of said first and second reference frequencies at a repetition rate of once every $t$ seconds.

References Cited in the file of this patent

UNITED STATES PATENTS

| | | |
|---|---|---|
| 2,166,991 | Guanella | July 25, 1939 |
| 2,424,984 | Hoffman | Aug. 5, 1947 |
| 2,530,528 | Kreer | Nov. 21, 1950 |
| 2,808,583 | Mathes | Oct. 1, 1957 |